United States Patent
Warner et al.

(10) Patent No.: US 11,410,499 B2
(45) Date of Patent: Aug. 9, 2022

(54) FINANCIAL GAMING PASSPORT FOR CASHLESS MOBILE GAMING

(71) Applicant: AUTOMATED CASHLESS SYSTEMS, INC., Reno, NV (US)

(72) Inventors: Stephen L. Warner, Zephyr Cove, NV (US); Michael Sackrison, Reno, NV (US); Shawn G. Quick, Reno, NV (US)

(73) Assignee: AUTOMATED CASHLESS SYSTEMS, INC., Reno, NV (US)

( * ) Notice: Subject to any disclaimer, the term of this patent is extended or adjusted under 35 U.S.C. 154(b) by 0 days.

(21) Appl. No.: 17/328,922

(22) Filed: May 24, 2021

(65) Prior Publication Data

US 2021/0287491 A1    Sep. 16, 2021

Related U.S. Application Data

(63) Continuation-in-part of application No. 16/677,399, filed on Nov. 7, 2019, now Pat. No. 11,282,337,
(Continued)

(51) Int. Cl.
| | |
|---|---|
| *G07F 17/32* | (2006.01) |
| *G06Q 40/02* | (2012.01) |
| *G06Q 50/34* | (2012.01) |

(52) U.S. Cl.
CPC ......... *G07F 17/3244* (2013.01); *G06Q 40/02* (2013.01); *G06Q 50/34* (2013.01); *G07F 17/3223* (2013.01); *G07F 17/3225* (2013.01)

(58) Field of Classification Search
CPC ............. G07F 17/3244; G07F 17/3223; G07F 17/3225; G06Q 40/02; G06Q 50/34
See application file for complete search history.

(56) References Cited

U.S. PATENT DOCUMENTS 5,259,613 A * 11/1993 Marnell, II ............. A63F 13/70
                                                         273/460
5,415,416 A *  5/1995 Scagnelli ............ G07F 17/3288
                                                         463/41
(Continued)

*Primary Examiner* — David L Lewis
*Assistant Examiner* — Matthew D Hoel
(74) *Attorney, Agent, or Firm* — Kerr IP Group, LLC

(57) ABSTRACT

A cashless mobile gaming system and method is described. The cashless mobile gaming system includes a network appliance, a financial gaming passport module, a mobile application disposed on a wireless device and one or more funding resources. The network appliance includes the financial gaming passport module, which operates an exchange between a casino patron and a casino operator that qualifies a financial transaction by ensuring regulatory compliance with gaming regulations. Funding sources are queried by the financial gaming passport to determine the available funds at the funding sources. A hold-fund request is generated by the funding source when the exchange request is approved by the funding source. The financial gaming passport communicates with the casino operator that if the casino operator issues a value to the casino patron, then the financial gaming passport certifies that the casino operator shall be reimbursed within a period of time by the funding source.

20 Claims, 4 Drawing Sheets

US 11,410,499 B2
Page 2

Related U.S. Application Data which is a continuation-in-part of application No. 15/657,272, filed on Jul. 24, 2017, now Pat. No. 10,706,680, which is a continuation of application No. 14/867,001, filed on Sep. 27, 2015, now Pat. No. 9,728,039, which is a continuation-in-part of application No. 14/710,109, filed on May 12, 2015, now Pat. No. 9,779,397.

(60) Provisional application No. 61/992,221, filed on May 13, 2014.

(56) References Cited

U.S. PATENT DOCUMENTS

| | | | | |
|---|---|---|---|---|
| 5,557,086 | A * | 9/1996 | Schulze | G07F 5/18 902/23 |
| 5,618,045 | A * | 4/1997 | Kagan | A63F 13/323 463/40 |
| 5,702,305 | A * | 12/1997 | Norman | A63F 13/843 463/31 |
| 5,761,647 | A * | 6/1998 | Boushy | G06Q 30/0201 705/7.29 |
| 6,251,014 | B1 * | 6/2001 | Stockdale | G07F 17/3202 463/16 |
| 6,287,200 | B1 * | 9/2001 | Sharma | A63F 13/795 463/40 |
| 6,304,860 | B1 * | 10/2001 | Martin, Jr. | G06Q 20/102 705/40 |
| 6,508,710 | B1 * | 1/2003 | Paravia | G07F 17/32 709/227 |
| 6,511,377 | B1 * | 1/2003 | Weiss | G07F 17/3281 902/23 |
| 6,524,189 | B1 * | 2/2003 | Rautila | A63F 13/795 463/40 |
| 6,547,131 | B1 * | 4/2003 | Foodman | G06Q 20/04 902/23 |
| 6,629,890 | B2 * | 10/2003 | Johnson | G07F 17/3288 463/40 |
| 6,645,077 | B2 * | 11/2003 | Rowe | A63F 13/77 463/43 |
| 6,674,995 | B1 * | 1/2004 | Meyers | A63F 13/327 455/466 |
| 6,793,134 | B2 * | 9/2004 | Clark | G06Q 20/4014 235/379 |
| 6,866,586 | B2 * | 3/2005 | Oberberger | G07F 17/3281 463/20 |
| 6,890,258 | B2 * | 5/2005 | Weiss | G07F 17/3251 463/43 |
| 6,893,347 | B1 * | 5/2005 | Zilliacus | A63F 13/332 463/43 |
| 6,997,807 | B2 * | 2/2006 | Weiss | G07F 17/32 463/20 |
| 7,004,837 | B1 * | 2/2006 | Crowder, Jr. | G07F 17/3244 463/16 |
| 7,137,889 | B1 * | 11/2006 | Luciano, Jr. | G07F 17/3244 705/17 |
| 7,201,660 | B2 * | 4/2007 | Kiely | G07F 17/32 348/14.02 |
| 7,217,190 | B2 * | 5/2007 | Weiss | G07F 17/3225 463/25 |
| 7,232,371 | B2 * | 6/2007 | Gatto | G07F 17/3248 902/23 |
| 7,455,591 | B2 | 11/2008 | Nguyen | |
| 7,625,279 | B1 | 12/2009 | Luciano, Jr. et al. | |
| 7,780,526 | B2 | 8/2010 | Nguyen et al. | |
| 7,828,647 | B1 | 11/2010 | Luciano, Jr. | |
| 7,844,255 | B2 | 11/2010 | Petrov et al. | |
| 7,846,020 | B2 | 12/2010 | Walker et al. | |
| 7,857,207 | B1 * | 12/2010 | Hopkins, III | G07F 19/201 221/9 |
| 7,861,002 | B2 * | 12/2010 | Puon | H04L 45/22 370/227 |
| 7,972,214 | B2 * | 7/2011 | Kinsley | G07F 17/3232 713/100 |
| 8,021,231 | B2 * | 9/2011 | Walker | G07F 17/32 463/29 |
| 8,038,532 | B2 * | 10/2011 | Neervoort | A63F 13/02 463/40 |
| 8,282,748 | B2 * | 10/2012 | Moll | C22C 1/005 419/10 |
| 8,388,448 | B2 * | 3/2013 | Kinsley | G07F 17/32 713/100 |
| 8,715,066 | B2 * | 5/2014 | Prather | G07F 17/3244 463/25 |
| 8,956,233 | B2 * | 2/2015 | Tanaka | A63F 13/12 463/42 |
| 8,968,075 | B2 * | 3/2015 | Warner | G06Q 40/02 463/16 |
| 8,979,642 | B2 * | 3/2015 | Warner | G06Q 20/027 463/25 |
| 8,979,643 | B2 * | 3/2015 | Warner | G06Q 40/02 463/25 |
| 8,979,644 | B2 * | 3/2015 | Warner | G06Q 40/02 463/25 |
| 9,294,604 | B1 * | 3/2016 | Wagner | H04M 1/72427 |
| 9,586,139 | B2 * | 3/2017 | Jabara | H04W 8/186 |
| 9,662,571 | B1 * | 5/2017 | Jabara | A63F 13/327 |
| 9,728,039 | B2 * | 8/2017 | Warner | G07F 17/3223 |
| 9,779,397 | B2 * | 10/2017 | Warner | G06Q 20/209 |
| 9,875,611 | B2 * | 1/2018 | Warner | G06Q 20/10 |
| 9,900,776 | B1 * | 2/2018 | Noonan | H04W 76/11 |
| 10,223,866 | B2 * | 3/2019 | Warner | G06Q 20/10 |
| 10,318,942 | B2 * | 6/2019 | Tsutsui | G06Q 30/0273 |
| 10,621,825 | B2 * | 4/2020 | Kubajak | G07F 17/3211 |
| 10,629,034 | B2 * | 4/2020 | Kubajak | G07F 17/3244 |
| 10,706,680 | B2 * | 7/2020 | Warner | G06Q 40/02 |
| 10,713,889 | B2 * | 7/2020 | Kubajak | G07F 17/3241 |
| 10,783,752 | B2 * | 9/2020 | Kubajak | G07F 17/42 |
| 10,818,144 | B2 * | 10/2020 | Kubajak | G07F 17/3227 |
| 10,825,290 | B2 * | 11/2020 | Mohrhardt | G07F 17/3216 |
| 10,890,025 | B2 * | 1/2021 | Uemizo | E05B 19/00 |
| 10,891,819 | B2 * | 1/2021 | Johnson | G07D 11/14 |
| 10,891,823 | B2 * | 1/2021 | Mohrhardt | G07F 17/3244 |
| 10,970,967 | B2 * | 4/2021 | Tsutsui | G06Q 50/01 |
| 10,991,198 | B2 * | 4/2021 | Mohrhardt | G07F 17/3216 |
| 11,011,018 | B2 * | 5/2021 | Warner | G07F 17/3244 |
| 11,100,759 | B2 * | 8/2021 | Kubajak | G07F 17/329 |
| 11,127,259 | B2 * | 9/2021 | Kubajak | G07F 17/34 |
| 11,189,136 | B2 * | 11/2021 | Kubajak | G07F 17/34 |
| 11,227,461 | B2 * | 1/2022 | Johnson | G07F 17/3206 |
| 11,257,331 | B2 * | 2/2022 | Kubajak | G07F 17/34 |
| 2002/0006825 | A1 * | 1/2002 | Suzuki | A63F 13/12 463/40 |
| 2002/0032656 | A1 * | 3/2002 | Chen | G07F 19/211 705/43 |
| 2002/0183110 | A1 | 12/2002 | Flanagan-Parks et al. | |
| 2003/0003996 | A1 * | 1/2003 | Nguyen | G06Q 20/10 463/25 |
| 2003/0022719 | A1 * | 1/2003 | Donald | G06Q 50/34 463/42 |
| 2003/0073494 | A1 | 4/2003 | Kalpakian et al. | |
| 2003/0083127 | A1 * | 5/2003 | Weiss | G07F 17/3225 463/25 |
| 2003/0087692 | A1 * | 5/2003 | Weiss | G07F 17/3225 463/25 |
| 2003/0145205 | A1 * | 7/2003 | Sarcanin | G06Q 20/3821 713/172 |
| 2003/0228898 | A1 * | 12/2003 | Rowe | G07C 9/37 463/25 |
| 2004/0087360 | A1 * | 5/2004 | Chamberlain | G07F 17/32 463/25 |
| 2004/0093309 | A1 * | 5/2004 | Nakamura | G07B 15/00 705/65 |
| 2004/0147309 | A1 * | 7/2004 | Chamberlain | G07F 17/42 463/25 |
| 2004/0253979 | A1 * | 12/2004 | Burr | H04L 69/329 455/552.1 |
| 2005/0065876 | A1 | 3/2005 | Kumar | |

(56) References Cited

U.S. PATENT DOCUMENTS

| | | | |
|---|---|---|---|
| 2005/0090308 A1* | 4/2005 | Weiss | G07F 17/3225 463/25 |
| 2005/0097017 A1* | 5/2005 | Hanratty | G06Q 20/227 705/38 |
| 2005/0107155 A1* | 5/2005 | Potts | G07F 19/203 463/25 |
| 2005/0107156 A1* | 5/2005 | Potts | G07F 17/3248 463/25 |
| 2005/0261058 A1* | 11/2005 | Nguyen | G07F 17/3255 463/40 |
| 2005/0266919 A1* | 12/2005 | Rowe | G07F 17/3251 463/25 |
| 2006/0111168 A1* | 5/2006 | Nguyen | G07F 17/3225 463/16 |
| 2006/0160610 A1* | 7/2006 | Potts | G07F 17/3255 463/25 |
| 2006/0172798 A1* | 8/2006 | Crowder, Jr. | G07F 17/3202 463/25 |
| 2006/0205481 A1* | 9/2006 | Dominelli | G07F 19/20 463/25 |
| 2006/0218091 A1* | 9/2006 | Choy | G06Q 20/06 705/40 |
| 2007/0060363 A1* | 3/2007 | Nguyen | G07F 17/34 463/42 |
| 2007/0225068 A1* | 9/2007 | Weiss | G07F 17/3225 463/25 |
| 2007/0246531 A1* | 10/2007 | Dabrowski | G07F 17/3248 235/379 |
| 2007/0282858 A1* | 12/2007 | Arner | H04L 67/02 |
| 2008/0015014 A1* | 1/2008 | Weiss | G07F 17/3255 463/25 |
| 2008/0113776 A1* | 5/2008 | Sommer | G07F 17/32 463/25 |
| 2008/0119284 A1* | 5/2008 | Luciano, Jr. | G07F 17/3244 463/25 |
| 2008/0139303 A1* | 6/2008 | Patterson | G06Q 30/02 463/25 |
| 2008/0153583 A1* | 6/2008 | Huntley | G07F 17/3281 463/25 |
| 2008/0242403 A1* | 10/2008 | Weiss | G07F 17/3255 463/43 |
| 2009/0005157 A1* | 1/2009 | Netley | G07F 17/3251 463/25 |
| 2009/0005159 A1* | 1/2009 | Netley | G07F 17/3251 463/25 |
| 2009/0099965 A1* | 4/2009 | Grant, IV | G06Q 20/3433 705/41 |
| 2009/0131146 A1* | 5/2009 | Arezina | G07F 17/32 463/20 |
| 2009/0138369 A1* | 5/2009 | Raja | G06Q 20/3678 705/26.1 |
| 2009/0287524 A1* | 11/2009 | Gnoato | G06Q 20/10 705/26.1 |
| 2009/0291755 A1* | 11/2009 | Walker | G07F 17/3262 463/29 |
| 2009/0299848 A1* | 12/2009 | Cao | G06Q 30/0207 705/14.1 |
| 2009/0305765 A1* | 12/2009 | Walker | G07F 17/34 463/43 |
| 2010/0062834 A1* | 3/2010 | Ryan | G07F 17/32 463/43 |
| 2010/0130284 A1* | 5/2010 | Luciano, Jr. | G07F 17/3244 463/25 |
| 2010/0197383 A1* | 8/2010 | Rader | G06F 21/105 463/43 |
| 2010/0222132 A1* | 9/2010 | Sanford | G07F 17/3244 463/25 |
| 2011/0086696 A1* | 4/2011 | MacEwan | G07F 17/32 463/43 |
| 2011/0230260 A1* | 9/2011 | Morrow | G07F 17/32 463/30 |
| 2011/0250972 A1* | 10/2011 | Horbay | G06Q 10/10 463/42 |
| 2011/0263318 A1 | 10/2011 | Agarwal et al. | |
| 2012/0142403 A1* | 6/2012 | Prather | G06Q 20/1085 463/19 |
| 2012/0144461 A1* | 6/2012 | Rathbun | G06Q 20/4014 726/5 |
| 2012/0258795 A1* | 10/2012 | Ryan | G07F 17/3206 463/29 |
| 2013/0172078 A1* | 7/2013 | Boyd | G07F 17/3227 463/29 |
| 2014/0094256 A1* | 4/2014 | Hilbert | G07F 17/34 463/20 |
| 2014/0194193 A1* | 7/2014 | Warner | G06Q 20/10 463/25 |
| 2014/0194194 A1* | 7/2014 | Warner | G06Q 40/02 463/25 |
| 2014/0194195 A1* | 7/2014 | Warner | G07F 17/3244 463/25 |
| 2014/0200073 A1* | 7/2014 | Warner | G06Q 20/1085 463/25 |
| 2015/0148120 A1* | 5/2015 | Warner | G06Q 20/1085 463/25 |
| 2015/0187177 A1* | 7/2015 | Warner | G06Q 20/10 463/25 |
| 2015/0339654 A1* | 11/2015 | Warner | G06Q 20/1085 463/25 |
| 2016/0027252 A1* | 1/2016 | Warner | G07F 17/3244 463/25 |
| 2018/0130295 A1* | 5/2018 | Warner | G07F 17/3223 |
| 2021/0287491 A1* | 9/2021 | Warner | G06Q 50/34 |

* cited by examiner

FINANCIAL GAMING PASSPORT FOR CASHLESS MOBILE GAMING

CROSS REFERENCE

This patent application is a Continuation-In-Part of patent application Ser. No. 16/677,399 entitled ENABLING FINANCIAL TRANSACTIONS FOR ELECTRONIC GAMING MACHINES filed on Nov. 17, 2019;

which is a Continuation of patent application Ser. No. 15/657,272 entitled ENABLING FINANCIAL TRANSACTIONS FOR ELECTRONIC GAMING MACHINES filed on Jul. 24, 2017 (now U.S. Pat. No. 10,706,680);

which is a Continuation of patent application Ser. No. 14/867,001 entitled ENABLING FINANCIAL TRANSACTIONS FOR ELECTRONIC GAMING MACHINES filed on Sep. 27, 2015 (now U.S. Pat. No. 9,728,039);

which is a Continuation-In-Part of patent application Ser. No. 14/710,109 entitled TRANSACTIONAL SYSTEM AND METHOD FOR A TABLE GAME filed on May 12, 2015 (now U.S. Pat. No. 9,779,397);

which claims the benefit of provisional patent application 61/992,221 entitled CASHLESS ELECTRONIC FUNDS TRANSACTION PROCESSING SYSTEM filed on May 13, 2014; and all the patent applications identified above are incorporated by reference in this patent application filing.

FIELD

The present disclosure relates to a financial gaming passport for a cashless mobile gaming system and method. More specifically, the cashless mobile gaming system and method includes a financial gaming passport that operates as an exchange between the casino patron and the casino operator; and only when specific criteria has been satisfied.

BACKGROUND

For a casino operator, there are a variety of challenges associated with managing financial transactions that include processing payments. Also, there are challenges with managing different types of casino-based financial instruments such as chips, tokens, TITO vouchers, slot machine credits, sports book wagers, e-wallets, front money accounts, markers, and other such casino-based financial instruments. These challenges include satisfying reporting requirements, various auditing requirements, anticipating cyber security threats, theft, fraud, dispute resolution issues, surveillance, and other such challenges associated with managing and controlling financial transactions and financial instruments.

For example, "wagering accounts" have received regulatory approval, but that approval puts the burden on each casino licensee to establish and maintain the wagering accounts and audit the monies placed in them. From the casino patron perspective, each casino patron must sign up separately for the different wagering accounts and then the customer is charged with monitoring each separate wagering account.

Casino vendors commonly promote 'e-wallets' where a phone or other mobile device is used to manage the transfer of funds into the e-wallet contained on the phone. If that phone is lost or stolen, and/or the identification/encryption keys of that wallet is lost, funds within those wallets are also lost. The e-wallet shares the same problems with wagering accounts. For example, if e-wallet A only works with one manufacturer's system, and e-wallet B only works with another manufacturer's systems, the player must install, configure, and maintain multiple e-wallets.

Payment processors that operate on a casino property must also meet requirements set by the local, state, and federal regulations. The challenge to payment processors is that 'gaming' regulations may be stricter than what banking regulations. For example, the 'daily limit per card' that Nevada's technical standards require are different from payment processors rules for approving a financial transaction or not.

Casino patrons also require a convenient mechanism to move money from wagering accounts and e-wallets to other bank accounts for easy access, and the ability to move remaining gaming funds, e.g., chips, TITO, cash from jackpots and hand-pays, back to their standard banking accounts.

Thus, it would be beneficial to provide a cashless gaming architecture which can comply with various gaming regulations, banking regulations, and can operate with wagering accounts and e-wallets.

Casino operators do not want to make large capital expenditures to upgrade existing equipment, i.e., table games and slot machines, in order to support a cashless infrastructure.

Therefore, it would also be beneficial to provide a cashless gaming architectures that does not require large capital expenditures to upgrade existing slot machines and table games.

SUMMARY

A cashless mobile gaming system and method is described. The cashless mobile gaming system includes a network appliance, a financial gaming passport module, a mobile application disposed on a patron wireless device and one or more funding resources. The network appliance includes the financial gaming passport module. The financial gaming passport module operates an exchange between a casino patron and a casino operator, in which the exchange qualifies a financial transaction that is performed between the casino patron and the casino operator by ensuring regulatory compliance with one or more gaming regulations. The mobile application is disposed on a patron wireless device. The mobile application receives an exchange request input that is communicated to the financial gaming passport. Funding sources are queried by the financial gaming passport to determine the available funds at the funding sources. A hold-fund request is generated by the funding source when the exchange request is approved by the funding source. The financial gaming passport then receives a communication from the funding source regarding the hold-fund request. The financial gaming passport communicates with the casino operator that if the casino operator issues a value to the casino patron, then the financial gaming passport certifies that the casino operator shall be reimbursed within a period of time by the funding source. The financial transaction is performed between the casino patron and the casino operator after the financial gaming passport qualifies the financial transaction as complying with the gaming regulations.

In one illustrative embodiment, the funding sources are be associated with at least one of a bank account, a credit account, a cash amount, a TITO ticket, and a credit in a slot machine.

In another embodiment, the hold-fund request locks the available funds and makes them unavailable for spending for a period of time.

In yet another embodiment, the hold-fund request locks the available funds based on a location of the patron mobile device.

In a still further embodiment, the hold-fund request releases the hold-fund request based on a location of the patron mobile device.

In another embodiment, a patron limit instruction that is received by the mobile application disposed on the patron wireless device. The patron limit instruction includes a spending limit that is applied to the one or more funding sources.

In an even further embodiment, the network appliance includes a master gateway including a problem gaming limit and a gaming rule set. The master gateway determines that the financial transaction complies with at least one of the problem gaming limit and the gaming rule set. The master gateway processes compliant financial transactions and rejects non-compliant financial transactions. The master gateway includes at least one of a tribal rule, a state gambling rule, a federal gaming rule, and a casino property rule.

A cashless mobile gaming method is also described. The method includes operating an exchange between a casino patron and a casino operator with a financial gaming passport module operating. The exchange qualifies a financial transaction that is performed between the casino patron and the casino operator by ensuring regulatory compliance with one or more gaming regulations. The method then proceeds to determine that a financial transaction complies with a problem gaming limit or a gaming rule set. The method associates the financial gaming passport module with the master gateway. The method receives an exchange request input that is communicated to the financial gaming passport from a mobile application disposed on a patron wireless device. The method then queries one or more funding sources to determine the available funds at the funding sources. The funding sources are associated with at least one of a bank account, a credit account, a cash account, a TITO ticket, and a credit in a slot machine. A hold-fund request is generated by the funding source when the exchange request is approved by the funding source. The financial gaming passport receives a communication from the funding source regarding the hold-fund request. The financial gaming passport communicates with the casino operator that if the casino operator issues a value to the casino patron, then the financial gaming passport certifies that the casino operator shall be reimbursed within a period of time by the funding source. The financial transaction between the casino patron and the casino operator is performed after the financial gaming passport qualifies the financial transaction as complying with the gaming regulations.

In one embodiment, the hold-fund request locks the available funds and makes them unavailable for spending for a period of time. In another embodiment, the hold-fund request locks the available funds based on a location of the patron mobile device. In yet another embodiment, the hold-fund request releases the hold-fund request based on a location of the patron mobile device.

In a further embodiment, a patron limit instruction is received by the mobile application disposed on the patron wireless device, in which the patron limit instruction includes a spending limit that is applied to the one or more funding sources.

In an even further embodiment, the master gateway includes at least one of a tribal rule, a state gambling rule, a federal gaming rule, and a casino property rule.

FIGURES

The present invention will be more fully understood by reference to the following drawings which are presented for illustrative, not limiting, purposes.

DESCRIPTION

Figure 1:
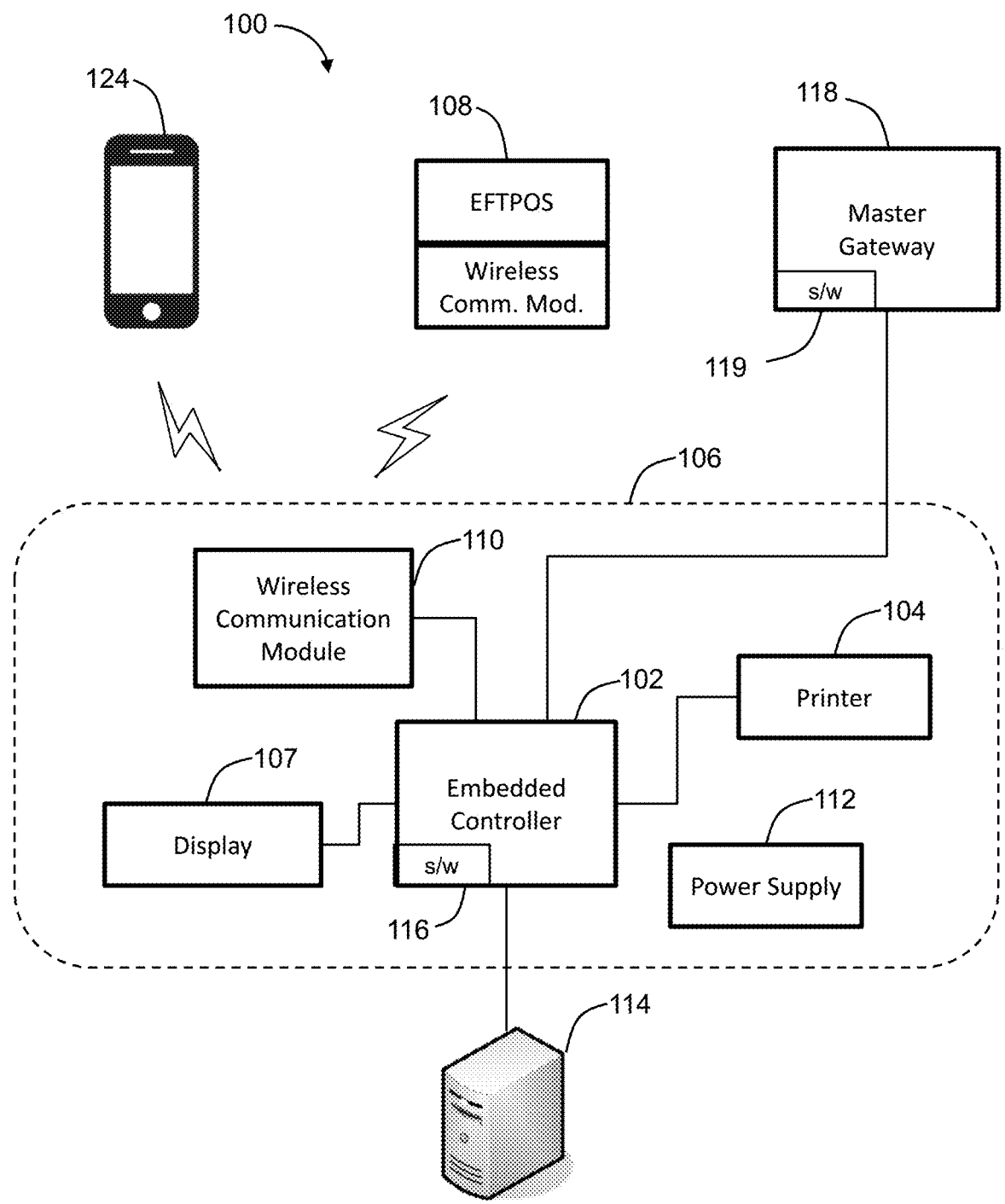
FIG. 1 shows an illustrative cashless mobile gaming system that includes a financial gaming passport.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized, and structural changes may be made without departing from the scope of the claims.

The financial gaming passport for cashless mobile gaming operates as a software module that is associated with a network appliance, e.g., a local server. In the illustrative embodiment presented herein, the financial gaming passport is associated with a master gateway that further includes a payment gateway and gaming gateway. The financial gaming passport may also exist as a cloud component, cloud module, a virtual machine, a container, a local server, a WAN server, a gateway, or other such network appliance.

In the illustrative embodiments presented herein, the financial gaming passport is only funded when the funds are dispensed, thus transactions are not recorded until the transactions have been completed and once completed the transactions are managed by the casino operator. The financial gaming passport does not hold funds. The financial gaming passport operates as an exchange between a casino patron and a casino operator, in which the exchange qualifies a financial transaction that is performed between the casino patron and the casino operator.

Additionally, the financial gaming passport for cashless mobile gaming provides a system and method that complies with various gaming regulations, banking regulations and can operate with wagering accounts and e-wallets. Additionally, the financial gaming passport for cashless mobile gaming does not require large capital expenditures to upgrade existing slot machines and table games.

There are various benefits to the financial gaming passport for cashless mobile gaming including, but not limited to, managing fewer transactional accounts, enabling banks and casino patrons to maintain control of funds, and minimizing the monitoring of the patron's behavior for problem gaming, and other benefits as described herein.

In operation, the financial transaction is performed between the casino patron and the casino operator after the financial gaming passport qualifies the financial transaction.

A mobile application on a patron's mobile device, e.g., a smartphone, communicates an exchange request to the financial gaming passport. In the illustrative embodiment, the mobile application is downloaded to the patron's smartphone.

Thus, the financial gaming passport replaces the need for a handheld POS device because it replicates some or most of the operations performed by a POS device. In operation, the financial gaming passport functions in a manner similar to an e-wallet in that it holds information related to multiple funding sources, but the financial gaming passport does not hold any monies, credits, or other such financial instruments of value, e.g., indicia of value.

Additionally, the financial gaming passport collects payment types and allows someone to set limits across the broad spectrum of their funding sources, as opposed to the current practices where they are required to limit or exclude each individual card or account. For example, a casino patron may set a $1,000 daily limit for a debit card transaction and then another daily limit of $1,000 for their PayPal® account, and the daily limits remain in effect for a preset period of time and may then be altered after expiration.

The financial gaming passport may also be integrated with the ACS PLAYON® slot systems, ACS PLAYON® table systems, or any combination thereof. Additionally, a mobile application running on a smartphone may receive a patron's financial instructions in a manner similar to an ACS PLAYON® POS device. Note, the ACS PLAYON® POS device is disposed at a slot machine and a table game in the ACS PLAYON® slot systems and the ACS PLAYON® table systems, respectively.

By way of example and not of limitation, the ACS PLAYON® slot system and ACS PLAYON® table systems include NFC components that communicate with the patron's NFC capable smartphone. Other short range radios may also be used to facilitate communications between the ACS PLAYON® systems such as Bluetooth and Wi-Fi.

The cashless mobile gaming system and the financial gaming passport may also be integrated with a "gaming gateway" that is configured to manage and perform the regulatory requirements associated with gaming or gambling. By way of example and not of limitation, the gaming gateway may include problem gaming limits and problem gaming rule sets. Illustrative problem gaming rule sets may include daily limits or may pause the period during which a person may withdraw funds to allow for a "cool down" period. Additionally, the gaming gateway may be configured to communicate with a regulatory gateway that includes a variety of rule sets such as tribal rules, state gambling rules, federal gaming rules, casino property gaming rules and other such gaming or "gambling" rule sets. Gaming is used to refer to gambling.

The gaming rules and gaming limits may include a variety of factors used by the gateway to determine the applicability of a particular gaming limit or gaming rule. The gateway can apply one or more of the factors when determining the applicability of a particular gaming rule or gaming limit to a fund transfer request or transaction. These factors can include, but are not limited to, temporal factors, geographic factors, and identification factors. In operation, each gaming limit and gaming rule provides a restriction on the number of transactions or total value of transactions during a time period, within a particular location, and attributed to a particular identity. The various factors would then be used by the gateway to define the time period, such as a day, as a calendar day, a gaming day, or a trailing period of 24 hours. Further, the gateway can use the factors to define a particular location as within a 50 mile radius, within the boundary of a particular State, within the limits of a City, within a Zip Code, within one or more properties of a Gaming Entity, within a single casino property, on a certain floor of a casino, at a particular bank of gaming machines, at a particular gaming machine, at a particular table, or at a particular position of a particular table. Finally, the gateway can use the factors to define an identity to which a gaming rule or gaming limit applies, such as a particular patron or a particular debit instrument (i.e., per card).

The client devices, systems and methods described herein use a proprietary financial network to route all transactions on the casino floor to a single backend server. The backend server has connections to both the banking and processing networks and also to the Casino's Accounting and Management Software Infrastructure (CMS). The CMS uses proprietary protocols and thus cannot be directly accessed by the backend server. In the illustrative embodiments presented herein, a Slot Machine Interface Board (SMIB) is used to format the data into a usable fashion for the CMS.

At least one benefit of the client devices, systems and methods presented herein is that only a small number of SMIBs will be required to interface with the CMS, even though client devices on the casino floor can be substantially higher, e.g., over 1000 client devices.

In order to provide a product that allows a gaming patron to use a financial instrument, such as a payment card (credit, debit, prepaid, or other method of transferring money), at a gaming device, a vendor must provide protections to the regulatory bodies, the casinos, and the patron that the process is safe and secure, and provide complete accounting, privacy, verification and meet all casino and banking regulatory requirements.

In the illustrative embodiment, the transactional systems and methods presented herein initiate, process and complete an electronic funds transaction (EFT) or something similar in a commercial environment. The transactional systems and methods may be used as a substitute for an automated teller machine (ATM), cash kiosk, or other such facility capable of completing the desired transaction. The transactional systems and methods are relatively small and portable, so the transactional client devices and systems may be easily relocated.

In the illustrative embodiment, the transactional systems and methods operate at a slot machine, which is also referred to interchangeably as an Electronic Gaming Machine (EGM). In the illustrative embodiment, the transactional system and method does not dispense cash, like a typical ATM. In another embodiment, the transactional system and method dispenses other indicia of value, e.g., loyalty points or gift cards.

The transactional system and method may be easily relocated, e.g., to a patron's point-of-play, thereby facilitating game play. Additionally, the transactional system and method eliminates the need to restock an unattended ATM machine with cash. Furthermore, the transactional client device, system and method operates with fewer complex mechanical components than an ATM.

The term "indicia of value" as used herein includes an electronic record, a printed record and a physical token that has a relative worth, i.e., value, to the end user, e.g., customer or patron, and the business or property, e.g., casino. In other words, an electronic record may operate as an indicia of value. Additionally, a printed record may also operate as an indicia of value.

The indicia of value has a relative worth to the business or property, e.g., casino, and the end user, e.g., patron, in the transactional system and method for a game that is presented herein.

An "electronic record operating as an indicia of value" is an electronic record that has relative worth to the end user and the business or property. There are a variety of secure communications that communicate an electronic record operating as an indicia of value in the transactional system and method for a game.

An illustrative electronic record operating as an indicia of value includes the electronic record received from the POS device, which securely communicates the electronic record to the controller. The controller then proceeds to transmit the electronic record operating as an indicia of value to the gateway, which further communicates the electronic record to the financial network or payment processor.

The controller then receives an authorization response from the gateway. The authorization response is another electronic record operating as an indicia of value.

The controller proceeds to transmit the authorization response to the POS device. Again, the transmitted authorization response is an electronic record operating as an indicia of value.

An optional "receipt" for the approved transaction is presented at the electronic gaming machine. A receipt, i.e., payment record, provides a printed record that a payment was received by the business or property, e.g., casino, from the end user, e.g. patron. However, the receipt is not an electronic record and does not have relative worth. In other words, the receipt is a printed record that does not have an indicia of value.

An "electronic record" (by itself) provides electronic or digital evidence that a business activity or transaction took place at a particular time. The electronic record is captured through an electronic or digital process. An electronic record includes a records management solution, which controls the creation, distribution, use, maintenance, and disposition of recorded information that is maintained as evidence of business activities or business transactions.

Thus, an electronic record operating as an indicia of value is a subset of an electronic record.

An "electronic record" may include other database attributes that are not specific to the electronic record operating as an indicia of value such as player loyalty information or accumulated loyalty points or player preferences and other such electronic records that do not correspond to an indicia of value.

A "printed record operating as an indicia of value" is a printed record that has relative worth to the end user and the business or property utilizing the transactional system and method presented herein. A TITO Ticket is an example of this.

In general, a "voucher" is a printed documents that have an indicia of value, which may be exchanged for goods, services, casino chips or any other indicia of value.

A "coupon" entitles the holder of the coupon to a discount for a particular product. A coupon is a type of voucher.

In gaming, the definition of a voucher is more granular because there are a variety of different vouchers including a complete voucher, a duplicate voucher, an incomplete voucher, and replacement voucher. A "complete voucher" (in gaming) contains, at a minimum, a complete validation number and is of a quality that can be redeemed through the use of an automated reader or scanner. A "duplicate voucher" is any reprinted complete voucher or incomplete voucher. An "incomplete voucher" contains, at a minimum, the voucher validation number printed across the printed leading edge and is manually redeemable but is not of a quality that can be redeemed through the use of an automated reader or scanner. A "replacement voucher" is printed following a failed attempt to print a complete or incomplete voucher.

An illustrative voucher system includes, but is not limited to, a Ticket In Ticket Out (TITO) system. A TITO ticket is an illustrative complete voucher that can be redeemed through the use of automated reader or scanner.

A "physical token operating as an indicia of value" is a physical token that has relative worth to the end user and the business or property. By way of example and not of limitation, casino chips, poker chips and gift cards are illustrative physical tokens operating as an indicia of value.

A "payment gateway" is also referred to interchangeably as the "banking gateway" and "financial gateway." The payment gateway is configured to communicate with at least one financial network or payment processor. Additionally, the payment gateway is configured to receive an authorization request, which is associated with an approved transaction.

A "gaming gateway" is configured to manage and perform the regulatory requirements associated with gaming or gambling. By way of example and not of limitation, the gaming gateway may include problem gaming limits and problem gaming rule sets. Illustrative problem gaming rule sets may include daily limits or may pause the period during which a person may withdraw funds to allow for a "cool down" period. Additionally, the gaming gateway may be configured to communicate with a regulatory gateway that includes a variety of rule sets such as tribal rules, state gambling rules, federal gaming rules, casino property gaming rules and other such gaming or "gambling" rule sets. Note, "gaming" is used interchangeably to refer to "gambling."

For purposes of this patent, reference is also made to a master gateway 118, which includes the payment gateway, the gaming gateway, and the financial gaming passport. The master gateway 118 may also be referred to interchangeably as the payment gateway, the gaming gateway, and the financial gaming passport.

Referring to FIG. 1 there is shown an illustrative cashless mobile gaming system that includes the financial gaming passport. The cashless mobile gaming system 100 permits a gaming patron to initiate and complete a transaction with the financial gaming passport. The financial gaming passport may be disposed at master gateway 118.

The cashless mobile gaming system includes a network appliance 118, a financial gaming passport module 119, a mobile application disposed on a patron wireless device 124 and one or more funding resources (not shown). The network appliance 118 includes the financial gaming passport module 119.

The financial gaming passport module 119 operates an exchange between a casino patron and a casino operator, in which the exchange qualifies a financial transaction that is performed between the casino patron and the casino operator by ensuring regulatory compliance with one or more gaming regulations.

The mobile application is disposed on a patron wireless device 124. The mobile application receives an exchange request input that is communicated to the financial gaming passport module 119. Funding sources are queried by the financial gaming passport to determine the available funds at the funding sources. A hold-fund request is generated by the funding source when the exchange request is approved by the funding source.

The financial gaming passport module 119 then receives a communication from the funding source regarding the hold-fund request. The financial gaming passport module 119 communicates with the casino operator that if the casino operator issues a value to the casino patron, then the financial gaming passport certifies that the casino operator shall be reimbursed within a period of time by the funding source. The financial transaction is performed between the casino patron and the casino operator after the financial gaming passport qualifies the financial transaction as complying with the gaming regulations.

By way of example and not of limitation, the funding sources are be associated with at least one of a bank account, a credit account, a cash amount, a TITO ticket, and a credit in a slot machine. In the illustrative embodiment, the hold-fund request locks the available funds and makes them unavailable for spending for a period of time. Additionally, the hold-fund request may 'lock' the available funds based on a location of the patron mobile device. Furthermore, the hold-fund request may release the hold-fund request based on a location of the patron mobile device.

A patron limit instruction may be received the wireless device 124 via the mobile application, in which the patron limit instruction includes a spending limit that is applied to the one or more funding sources.

The master gateway 118, which is the illustrative network appliance, may be configured to include a problem gaming limit and a gaming rule set. The master gateway 118 determines that the financial transaction complies with at least one of the problem gaming limit and the gaming rule set. Also, the master gateway 118 processes compliant financial transactions and rejects non-compliant financial transactions. The master gateway 118 may includes at least one of a tribal rule, a state gambling rule, a federal gaming rule, and a casino property rule.

In operation, the financial gaming passport disposed at master gateway 118 operates as an exchange between a casino patron and a casino operator. The exchange qualifies a financial transaction that is performed between the casino patron and the casino operator. The mobile application disposed on a personal mobile device 124 communicates an exchange request to the financial gaming passport disposed at master gateway 118.

One or more funding sources are queried by the financial gaming passport module 119 to determine the available funds at the funding sources consistent with the exchange request. A hold-fund request is generated by the funding source when the exchange request is approved by the funding source. The financial gaming passport module 119 then receives a communication from the funding source regarding the hold-fund request. The funding sources may be associated with at least one of a bank account, a credit account, a cash amount, a TITO ticket, and a credit in a slot machine. The hold-fund request locks the available funds and makes them unavailable for spending for a period of time.

In operation, the financial gaming passport module 119 communicates with the casino operator that if the casino operator issues a value to the casino patron, then the financial gaming passport certifies that the casino operator shall be reimbursed within a period of time by the funding source. The financial transaction is performed between the casino patron and the casino operator without the financial gaming passport performing the financial transaction.

Additionally, the financial gaming passport for the cashless mobile gaming system 100 includes an embedded controller 102. By way of example and not of limitation, a hard wire connection is made between the embedded controller 102 and a dedicated printer 104 that also generates a printed record operating as an indicia of value. The combination of the embedded controller 102 and printer 104 is enclosed in a printer box or housing 106.

By way of example and not of limitation, the embedded controller 102 may be embodied as an ARM based Linux embedded controller with USB and Ethernet connectivity to the printer 104. The illustrative printer 104 may be an Ithaca 950 printer that has a hardwire connection to the embedded controller 102. Alternatively, the printer has a secure wireless connection to the embedded controller 102. More specifically, the embedded controller 102 may be communicatively coupled to the printer 104 using a secure wireless communication channel that operates using a wireless communication protocol such as Wi-Fi, Bluetooth, Zigbee, or other such wireless communication protocol.

In the illustrative embodiment, the embedded controller 102 includes a central processing unit ("CPU"), at least one static or random access memories, at least one port that permits connection of one or more external memories or data storage devices. For illustrative purposes, the CPU may include an ARM-based microprocessor, RISC microprocessor, or other such microprocessor suitable for the intended purpose.

The illustrative embedded controller 102 includes one or more local device and network connectivity modules for communication using wired, wireless, near-field communications (NFC), other electromagnetic, fiber optic, other optical, or other communication means and/or protocols, including but not limited to USB (X).(Y), the proprietary Standard Peripheral Communication ("SPC") protocol used in certain gaming devices, RS-232, RS-422, RS-485, IEEE 1394, wired Ethernet, Wi-Fi, 802.1(x)(y) compliant methods, Bluetooth™, infrared, optical, radio frequency, CDMA, GSM, GPRS, satellite, and the like. The network communication modules may include one or more ports enabled and associated with the network communication modules. The embedded controller may be configured to provide multiple ports that are simultaneously active using different protocols, multiple instances of the same protocol, or any combination thereof.

The illustrative embedded controller 102 operates under the control of an operating system such as, but not limited to, one based on the open-source Linux kernel with appropriate device drivers and other software necessary to securely implement the transactional functionality presented herein. More generally, the embedded controller 102 may operate with any other suitable operating system based on open-source or proprietary software or firmware.

In the illustrative embodiment, the printer box 106 houses the embedded controller 102, the wireless communication module 110, the printer 104 and the power supply 112. In the illustrative embodiment, the box 106 may be disposed below an illustrative table game. The illustrative box 106 provides a single semi-portable enclosure. In some embodiments, the housing 106 is integrated into the table game so that a surface of the housing is visible to the dealer or casino personnel, for example the visible housing surface may be exposed to the dealer on a side portion of the table game in the dealer's area that is not visible to patrons. However, the housing 106 may be integrated into a table game so that the housing 106 is also visible to patrons at the table game, i.e., on the top surface of the table game or the gaming surface of the game. In these embodiments, a display 107 is disposed on the visible surface of the housing 106. The display 107 is communicatively coupled to the embedded controller 102 in order to receive transaction data relating to transaction requests and transmit dealer confirmations relating to authorized transactions.

In the illustrative embodiment, the printer box 106 provides a single enclosure or housing that includes the embedded controller 102 that is communicatively coupled to a dedicated printer 104. The embedded controller 102 and printer 104 communicate via a local communication protocol such as, but not limited to, RS-232, USB(X).(Y), SPC, RS-422, RS-485, IEEE 1394, or the like. By way of example and not of limitation, a protocol conversion interface or controller board may be utilized between the embedded controller 102 and the dedicated printer 104 to establish a secure data communication path between the two devices utilizing available or desired ports in each one. The dedicated printer includes any device suitable for generating a printed record operating as an indicia of value.

The illustrative box 106 may be quickly and easily relocated within an establishment as desired. A gaming property, such as a casino, may deploy such printer boxes 106 in locations where there is a demand for the cashless mobile gaming system and methods presented herein. Since the printer boxes 106 are semi-portable systems, the printer boxes 106 may be moved around to any location that has suitable AC power.

The illustrative embedded controller 102 and the dedicated printer 104 operate directly from conventional 120V AC power. One or more transformers, power supplies, power converters, or any suitable combination thereof are supplied and configured between the devices and the source of 120V AC power to provide power to the two devices with the required voltage and current availability for proper operation. Such combination of transformers, power supplies, and power converters may provide regulated or unregulated power to the devices.

An illustrative power supply 112 includes a 24V power supply unit that powers the printer 104. Additionally, the power supply includes a 25V to 5V voltage converter that powers the embedded controller, which in turn powers the wireless communication module 110. The illustrative EFT terminal 108 is a wireless device that is powered by a rechargeable battery. For the purposes of this disclosure, the terms EFT terminal, and Point of Sale (POS) terminal are used interchangeably.

The embedded controller 102, the dedicated printer 104, or the combination thereof operate for a limited time period utilizing a source of stored energy, such as an uninterruptable power supply ("UPS"), other battery configuration, charged capacitive storage device, or the like. Such stored energy devices charge automatically from an 120V AC power source when such power is available, but in the event of any interruption in such source, either or both device(s) continue to operate for a limited period of time using the stored energy. This is particularly advantageous to permit completion of any EFT in process at the time of an interruption in the commercial power service or if the subsystem should become inadvertently disconnected from AC power.

In the illustrative embodiment, the embedded controller 102 has a limited number of secure connections to other devices, thus a firewall is not required between the embedded controller 102 and the securely connected devices. Also, the illustrative embedded controller 102 constantly monitors and automatically detects any disconnection(s) and attempted reconnection(s). If any of the data connections are disconnected or otherwise inoperative, no transactions may be processed by the cashless mobile gaming system and method. For example, the embedded controller 102 securely communicates with the EFT terminal 108, the banking gateway 118 and the server 114 without the need for a firewall.

Alternatively, at least one firewall may be disposed between the embedded controller and at least one of the data connections including, but not limited to, the EFT terminal 108, the gateway 118 and a server (not shown); and the type of firewall is dependent on the type of data connection.

The embedded controller 102 is also communicatively coupled to a wireless device. In the illustrative embodiment, the wireless device is an Electronic Funds Transfer (EFT) terminal 108 that uses a wireless connection such as an IEEE 802.11 (WiFi), IEEE 802.15 (Bluetooth/Zigbee) or other such wireless communication standard. The EFT terminal may include a printer for printing a receipt or other indicia of a transaction for the patron. The process of generating a secure communication between the embedded controller 102 and the EFT terminal 108 is performed by an EFT software module 115 communicating with an embedded controller software module 116. In the illustrative embodiment, the EFT software module 115 is configured to present the illustrative end user, e.g., casino patron, with user instructions.

More specifically, the illustrative EFT terminal 108 is a Blue Bamboo P200, which includes a PCI certified receipt printer, a PIN pad, an NFC contactless solution, an LCD display, an EMV card reader and a mag stripe card reader. The EMV card reader is compatible with the EMV global standard for authentication of credit and debit card transactions. The EFT terminal 108 may also include a payment card industry (PCI) and pin entry device (PED) certified device.

The Blue Bamboo P200 or other such compatible device includes proprietary software 115 that may be embodied as a STIPlet that conforms to the Global Platform Small Terminal Interoperability Platform (STIP) standard. The pre-encrypted data sent between the STIPlet or comparable application running on the EFT terminal 108 and the custom proprietary software application running on the embedded controller may be encoded using a proprietary format. Even if the encryption of the data is broken, the plaintext format of the data will still be unknown. Alternative devices are configured to provide similar functionality as the STIPlet with a combination of firmware and software that operates on a device configured to perform the functions presented herein.

The wireless devices, i.e., mobile device 124 and EFT terminal 108, includes a hardware module (not shown) that supports secure wireless communication using wireless communication protocols such as Bluetooth, Zigbee, Wi-Fi and other such wireless communication protocols. Additionally, the embedded controller 102 is communicatively coupled to a wireless communication module 110, which is also configured to support secure wireless communication using wireless communication protocols such as Bluetooth, Zigbee, Wi-Fi, and other such wireless communication protocols.

More generally, the wireless devices 124 and 108 may include a central processing unit ("CPU"), one or more static or random access memories, and one or more ports to permit connection of one or more external memory or data storage devices. The wireless device may further include a point-of-sale (POS) personal identification number (PIN) entry keypad and one or more displays or display devices. The wireless device may include a payment card reader that may be a smart card reader, a magnetic card reader, a high-capacity optical storage media reader, a bar code, QR code, or other optical data storage reader, a punch card reader, a Braille reader, a contactless card reader, a proximity mobile payments reader that enables communication with smart phone devices, a contactless proximity card reader that processes secure smart ticketing and electronic payments using contactless secure mobile commerce technology, or any other device or system which retrieves information stored on or in a payment card or its functional equivalent.

The wireless devices 124 and 108 may include one or more network connectivity modules for communication using wired, wireless, near-field communications (NFC), other electromagnetic, fiber optic, other optical, or other communication means and/or protocols, including but not limited to Wi-Fi, 802.1(x)(y) compliant methods, Bluetooth™, infrared, optical, radio frequency, CDMA, GSM, GPRS, and satellite. The network communication modules may include one or more ports enabled and associated with the network communication modules. Network connectivity may be achieved by the wireless device via any one or combination of several communication modules and communication modes based on operational situations. For example, the wireless device may communicate via a wired network using the appropriate wired communication module while the wireless device is placed in a wired connectivity cradle equipped with access to a wired network and the appropriate connector(s) to operatively communicate with a wired communication module port. When the wireless device is removed from the wired connectivity cradle, the wireless device may be switched from a wired communication mode to a wireless communication mode via activation and deactivation of the appropriate communication modules. The switch from wired to wireless communication mode may be performed automatically by software or firmware running on the wireless device or performed manually at the direction of a user. Similarly, the wireless device may automatically select or be manually instructed to utilize one of several available communication modules and modes to use based on operational factors such as, but not limited to, availability of service, signal strength, security considerations, available bandwidth, link reliability, and the like by activating desired communication module(s) and deactivating others. The wired connectivity cradle may also comprise a wireless access port operatively connected to the wired network and accessible by a wireless communication module in one or more wireless devices, thereby providing a localized point of network access for one or more wireless devices in a gaming environment within which the electromagnetic spectrum may be highly congested and radio frequency interference is prevalent. The wireless device may comprise a printer and/or a printer port for connection of an external printer or a plurality of printers connected to a plurality of gaming devices via wired, wireless, or other communication means. The wireless device may be powered by alternating current, direct current, battery, stored charge, solar, or any other known power source available at the point of use. Wireless devices powered by stored energy sources may be periodically recharged from other power sources, including but not limited to charging a stored energy source when the wireless device is placed in a special cradle that may provide wired network connectivity as described above in addition to power charging capability.

In the illustrative embodiment, the embedded controller 102 does not perform payment functions; the payment functions are initiated by the EFT terminal 108 or the instructions received from the wireless device 124. The embedded controller 102 securely transmits the requests from the EFT terminal 108 or the wireless device 124. Since the embedded controller does not perform the payment function of generating the EFT request, there is little or no risk of a security breach resulting from the embedded controller 102 initiating a payment transaction. Thus, the wireless device(s), e.g. embedded controller 102, securely communicates a plurality of transactional data to the controller, wherein the transactional data corresponds to the transaction initiated by the wireless device.

The embedded controller 102 is also communicatively coupled to a gateway 118, which may also be referred to as the banking gateway. For purposes of this patent, the terms "financial gaming passport," "payment gateway," "banking gateway" and "master gateway" may be used interchangeably, however, in general the term "banking gateway" refers to the illustrative casino table embodiment and "payment gateway" refers to the more general embodiment. Also, "financial gaming passport" refers to an exchange between a casino patron and a casino operator, in which the exchange qualifies a financial transaction that is performed between the casino patron and the casino operator. The gateway 118 is configured to communicate with at least one financial network. Additionally, the payment gateway is configured to receive an authorization request, which is associated with an approved transaction.

A payment gateway software module, e.g., banking gateway software module 119, resides in the gateway 118 and includes proprietary software that communicates with the embedded controller 102. In the illustrative embodiment, the embedded controller 102 is communicatively coupled to a banking gateway API using a secure network communication protocol. The banking gateway 118 is communicatively coupled to one or more financial networks, including but not limited to the PLUS, STAR, CIRRUS, INTERLINK, MONEY PASS, or NYCE networks, that provide access to the server(s) associated with patrons' financial accounts.

By way of example and not of limitation, the embedded controller 102 is communicatively coupled to the banking gateway 118 using a wired Ethernet (TCP/IP) that employs an illustrative security protocol such as HTTPS utilizing SSL/TLS. Other security protocols may also be used. The HTTPS protocol provides authentication and protects the privacy and integrity of the exchanged data.

In the illustrative embodiment, the banking gateway software module 119, which resides in the gateway 118, includes proprietary software controlled by the banking gateway 118. More specifically, the banking gateway software module 119 includes a payment gateway API that is proprietary to at least one specific payment gateway service. In an alternative embodiment, the banking gateway 118 does not include the banking gateway software module 119; thus, the banking gateway 118 represents an external service associated with, but not controlled by, the cashless mobile gaming system.

In operation, the embedded controller 102 connects to and exchanges data with the external banking gateway 118. The transaction is initiated with an outbound EFT request, which is associated with a patron interacting with the wireless EFT terminal 108. Applicable data is forwarded from the wireless terminal 108 to the embedded controller 102, which is then sent to the banking gateway 118 and then to the appropriate financial network associated with the institution or other entity that manages and controls the patron's account. The result of the processed EFT request from the institution or entity is conveyed back to the banking gateway 118 via the financial network and then back to the embedded controller 102 for further disposition.

More generally, the payment gateway is communicatively coupled to the controller 102. The payment gateway securely communicates with at least one financial network. The controller securely communicates the received transactional data to the payment gateway. The controller then receives an authorization response from the payment gateway for an approved transaction. The controller communicates the authorization response to the wireless device, which presents a receipt for the approved transaction at the wireless device. Additionally, the controller 102 communicates the authorization response and associated transaction data to the server, which compiles transaction data for authorized transactions into a summary of transactions for a given time period, i.e., a transaction summary. Transaction summaries may be stored and/or compiled in a database module resident on the server. Alternatively, the controller 102 itself may compile transaction data for authorized transactions initiated through the particular controller 102 into a summary of transactions. By compiling transaction data in one or more transaction summaries, the cashless mobile gaming systems and methods may delay printing of an indicia of value, or entirely eliminate the step of printing an indicia of value. Thus, the indicia of value may be printed at a later time, after several transactions have been performed through the controller 102. When the indicia of value is printed at a later time, the controller may instruct the printer to print indicia of value for all transactions that occurred during a selected time period, such as the previous day, previous 24 hours, or some other time period beginning and ending prior to the time of printing. However, despite compiling transaction summaries on the server or the controller 102, the controller 102 may communicate the authorization response to the printer 104, which generates a printed record operating as an indicia of value that corresponds to the transaction initiated by the wireless device. The printed record operating as an indicia of value is converted to at least one casino chip at the table game. As an alternative to, or in conjunction with printing an indicia of value at the printer 104, the controller 102 may communicate the authorization response to the display 107. The display 107 may then prompt a dealer or other casino employee to confirm the authorization prior to dispensing gaming chips or other indicia of value to the patron requesting the EFT.

In yet another embodiment, the payment/banking gateway also acts as a gaming regulatory gateway and adheres to limits, rules and standards that are set forth in accordance with specific gaming jurisdictions. The gateway may or may not handle rules and limits for more than one instance of the product simultaneously, such as handling rules of jurisdiction one for site 1 and rules of jurisdiction two for site 2. The gateway makes initial determinations based on these limits, rules, and standards about whether a transaction should be processed and sent on to the financial network or rejected without being sent.

The payment gateway also has the ability to apply business based logic rules to initiated transactions. These parameters will determine the optimal transaction routing through the payment networks and can also determine whether or not to deny transactions based on pre-determined criteria.

In some embodiments the gateway 118 is a master gateway. The master gateway includes or is communicatively coupled a database containing a plurality of gaming limits and gaming rules that each include a variety of factors used to determine the applicability of a particular gaming limit or gaming rule to a fund transfer request. These factors can include, but are not limited to, temporal factors, geographic factors, and identification factors. Each gaming limit and gaming rule provides a restriction on the number of transactions or total value of transactions during a time period, within a particular location, and attributed to a particular identity. The temporal factors provide granularity to the gaming limit or gaming rule time period, defining the time period of an hour as a trailing period of 60 minutes or 2:00 p.m. to 3:00 p.m., e.g., and defining the time period of a day as a calendar day, a gaming day, or a trailing period of 24 hours. The geographic factors provide granularity to the gaming limit or gaming rule location restriction such as by defining a location as any transactions occurring within a 50 mile radius, within the boundary of a particular State, within the limits of a City, within a Zip Code, within one or more properties of a Gaming Entity, within a single casino property, on a certain floor of a casino, at a particular bank of gaming machines, at a particular gaming machine, at a particular table, or at a particular position of a particular table. Further, the geographic factors may define a casino property as a particular casino location or any casino owned by a certain Gaming Entity, i.e., a particular legal entity such as a corporation. The identification factors provide granularity to the gaming limit or gaming rule identity restriction such as by defining that the gaming rule or gaming limit applies to a particular patron or a particular debit instrument (i.e., per card).

In one embodiment, the master gateway 118 retrieves gaming limits and gaming rules applicable to a fund transfer request, such as by assessing the transaction information associated with the fund transfer request for the location from which the fund transfer request was made by a patron and determining that one or more tribal gaming rules, one or more state gaming rules, one or more federal gaming rules, or any combination thereof applies to the fund transfer request. The master gateway can also assess the transaction information associated with the fund transfer request for the identity of the patron making the request or the particular card associated with the request and determining that one or more gaming limit, such as a problem gaming limit, a House gaming limit, or a combination thereof applies to the fund transfer request.

The master gateway 118 further retrieves transaction information for all other transactions related to the fund transfer request based upon the factors defining the applicable gaming limits and gaming rules, i.e., other transactions made by the same patron, or by the same patron within a certain time period. The master gateway can then decide whether the fund transfer request is compliant or non-compliant with the applicable gaming limits and gaming rules.

Figure 2:
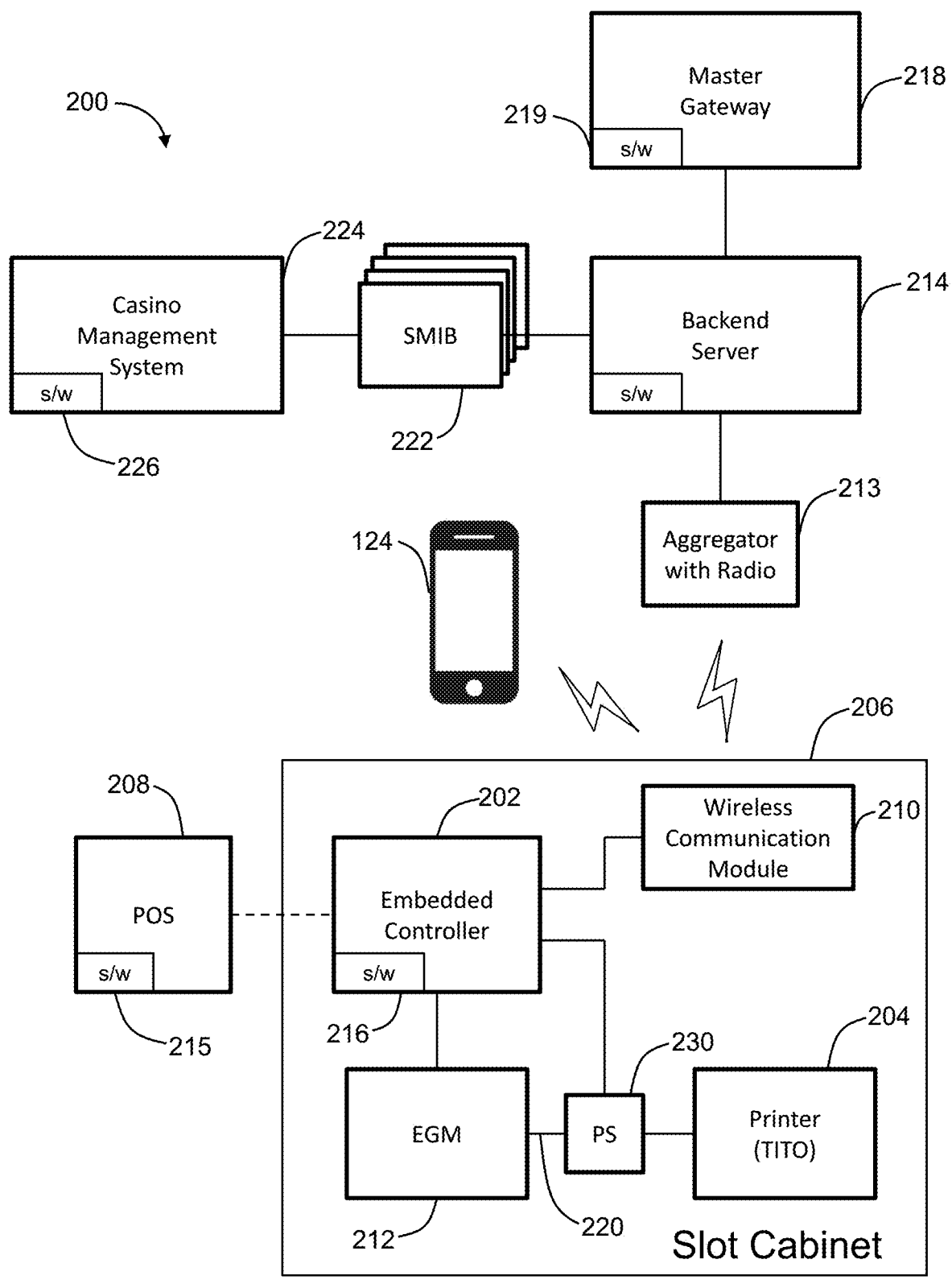
FIG. 2 shows another illustrative transactional system communicatively coupled to a mobile device.

Referring to FIG. 2 there is shown another illustrative transactional system communicatively coupled to a mobile device. The transactional system 200 includes an embedded controller 202 that is communicatively coupled to a printer sharing board 230 which is communicatively coupled to a printer 204, which are all housed within a slot cabinet 206. By way of example and not of limitation, a hard wire connection is made between an embedded controller 202 and a dedicated printer 204, which generates a printed record operating as an indicia of value. The combination of the embedded controller 202 and printer 204 is housed in the slot cabinet 206.

The embedded controller 202 is configured to receive encrypted data from a wireless device 124 or a POS client device and communicates the encrypted data to a wireless communication module 210. The embedded controller 202 controls the authorization of the components of the system 200, which allows a specific local device to connect to the wireless mesh network automatically and securely. The embedded controller 202 may also be configured to add one or more additional layers of encryption above and beyond the tokenized information received from the personal wireless device 124 or POS device 208.

The embedded controller 202 is also communicatively coupled to wireless communication module 210. The illustrative wireless communications module 210 uses IEEE 802.15 wireless communication protocols to send data from the embedded controller to an aggregator 213 located at various points inside of the casino. As described in further detail below, the wireless communications module 210 also communicates incoming data transmissions containing authorization and voucher validation information. The wireless communication module 210 may also be configured to provide broadcast and point-to-point transmissions, and forwards packets not intended for embedded controller 202, but which are intended for multi-hop transmissions to other embedded controllers (not shown).

In the illustrative embodiment, the slot cabinet 206 houses the embedded controller 202, the wireless communication module 210, the printer 204 and Electronic Gaming Machine (EGM) 212, which is also referred to as a "slot machine." The slot machine cabinet 206 refers to the housing which includes various modules such as the embedded controller 202. The EGM Controller 212 includes a central processing unit of a game which is associated with the slot machine. Additionally, the EGM 212 controls the printing of tickets and the generation of voucher validation codes for slot machine generated tickets, e.g., TITO tickets.

The embedded controller 202 is also configured to communicate with a printer sharing board 230 through the sending of a logic request signal. The printer sharing board 230 monitors the communications between the EGM 212 and the TITO printer 204, which allows the printer sharing board 230 to re-route the EGM 212/TITO printer 204 connection 220 when the embedded controller 202 receives an instruction to print the illustrative ACS PLAYON® voucher. The connection 220 is only broken when there is no data communication occurring between the EGM 212 and the TITO printer 204. The printer sharing board 230 utilizes fail-closed technology to ensure that if the embedded controller 202, the POS device 208 and the wireless communications module 210 are individually or collectively not working, then the connection 220 between the EGM 212 and the TITO printer 204 will be in place and allow the slot machine 212 to function normally and communicate with TITO printer 204. Additionally, the printer sharing board 230 provides logic which allows the embedded controller 202 to exchange data with the EGM controller 212 and/or the printer 204 when connection 220 is open. This is a key element for universal compatibility because it prevents the EGM from detecting loss of communication with the printer.

The print sharing module includes a logic module that monitors data communications between the electronic gaming machine processor and the printer. The controller is electrically coupled to the printer sharing module. The controller is configured to generate a request signal that is communicated to the printer sharing module that re-routes the communication between the electronic gaming machine processor and the printer. The printer sharing board reroutes the communications between the electronic gaming machine processor and the printer and allows the printer sharing board to communicate with the printer.

By way of example and not of limitation, the embedded controller 202 may be embodied as an ARM based embedded controller with connectivity to the printer 204 as required by the printer manufacturer. In general, the printer 204 may be a thermal printer that is used to print vouchers in a gaming environment. The illustrative printer 204 may be an Ithaca 950 printer that has a hardwire connection to the printer sharing board 230.

In the illustrative embodiment, the embedded controller 102 includes a central processing unit ("CPU"), at least one static or random access memories and at least one port that permits connection of one or more external memories or data storage devices. For illustrative purposes, the CPU may include an ARM-based microcontroller, RISC microcontroller, or other such microcontroller suitable for the intended purpose.

The illustrative embedded controller 202 comprises one or more local device and network connectivity modules for communication using wired, wireless, near-field communications (NFC), other electromagnetic, fiber optic, other optical, or other communication means and/or protocols, including but not limited to USB), the proprietary Standard Peripheral Communication ("SPC") protocol used in certain gaming devices, RS-232, RS-422, RS-485, IEEE 1394, wired Ethernet, Wi-Fi, 802.1 (x)(y) compliant methods, Bluetooth™, infrared, optical, radio frequency, CDMA, GSM, GPRS, satellite, and the like. The network communication modules may include one or more ports enabled and associated with the network communication modules. The embedded controller may be configured to provide multiple ports that are simultaneously active using different protocols, multiple instances of the same protocol, or any combination thereof.

In the illustrative embodiment, the slot cabinet housing 206 provides a single enclosure or housing that includes the embedded controller 202 that is communicatively coupled to a dedicated printer 204 via the printer sharing board 230. The printer sharing board 230 and printer 204 communicate via a local communication protocol such as, but not limited to, RS-232, USB(X).(Y), SPC, RS-422, RS-485, IEEE 1394, or the like. By way of example and not of limitation, a protocol conversion interface or controller board may be utilized between the printer sharing board 230 and the dedicated printer 204 to establish a data communication path between the two devices utilizing available or desired ports in each one. The dedicated printer includes any device suitable for generating a printed record operating as an indicia of value.

The illustrative embedded controller 202 and the dedicated printer 204 operate directly from conventional 120V AC power. One or more transformers, power supplies, power converters, or any suitable combination thereof are supplied and configured between the devices and the source of 120V AC power to provide power to the two devices with the required voltage and current availability for proper operation. Such combination of transformers, power supplies, and power converters may provide regulated or unregulated power to the devices.

The illustrative wireless device 124 and/or POS client device 208 includes software that allows a patron to enter transaction details such as amount and provide fee approval. Additionally, the illustrative POS client device 208 can support receiving a magstripe card swipe, an EMV card with a smart card and other such cards or NFC type device. The wireless device 124 and/or POS client device 208 also encrypts the transaction details for transmission to the master gateway 218. The wireless device 124 and/or POS client device 208 is configured to also display authorization or decline information after it is received from the master gateway 218. I The embedded controller 202, the dedicated printer 204, or the combination thereof operate for a limited time period utilizing a source of stored energy, such as an uninterruptable power supply ("UPS"), other battery configuration, charged capacitive storage device, or the like. Such stored energy devices charge automatically from an 120V AC power source when such power is available, but in the event of any interruption in such source, either or both device(s) continue to operate for a limited period of time using the stored energy. This is particularly advantageous to permit completion of any EFT in process at the time of an interruption in the commercial power service or if the subsystem should become inadvertently disconnected from AC power.

The embedded controller 202 is communicatively coupled to wireless device 124, e.g., a smartphone, via wireless communication module 210. The wireless communication module 210 and wireless device 124 supports Near Field Communications (NFC), Wi-Fi, Bluetooth, Zigbee and other such short range wireless communication standards.

The embedded controller 202 is also communicatively coupled to a POS device. In the illustrative embodiment, the device is a Point of Sale (POS) terminal 208 or an Electronic Funds Transfer (EFT) terminal 208 that uses a wired or wireless connection such as an IEEE 802.11 (Wi-Fi), IEEE 802.15 (Bluetooth/Zigbee) or other such wireless communication standard. Note, the terms POS and EFT are used interchangeably for purposes of this patent.

The process of generating a secure communication between the embedded controller 202 and the POS terminal 208 and/or wireless device 124 is performed by a software module 215 communicating with an embedded controller software module 216. In the illustrative embodiment, the POS software module 215 is configured to present the illustrative end user, e.g., casino patron, with user instructions.

The wireless device 124 includes one or more radios that support communications using various standards such as Near-Field Communications (NFC), Wi-Fi, GSM, LTE, 5G and 6G. At least one of the wireless device 124 radios is configured to communicate with wireless communication module 210. The wireless device 124 may download mobile applications from an app store or the wireless device may be preconfigured to communicate with the master gateway 218 via wireless communication module 210. By way of example and not of limitation, the wireless device 124 is a patron's smartphone.

By way of example and not of limitation, the illustrative POS terminal 108 is a YouTransactor SK100 which includes a PCI certified PIN pad, an NFC contactless solution, an LCD display, an EMV card reader and a mag stripe card reader. The EMV card reader is compatible with the EMV global standard for authentication of credit and debit card transactions. The POS terminal 208 may also include a payment card industry (PCI) and pin entry device (PED) certified device.

The YouTransactor SK100 or other such compatible device includes proprietary software 215. The pre-encrypted data sent between the custom software application or comparable application running on the POS terminal 208 and the custom proprietary software application 216 running on the embedded controller may be encoded using a proprietary format. Even if the encryption of the data is broken, the plaintext format of the data will still be unknown. Alternative devices are configured to provide similar functionality as the custom software application with a combination of firmware and software that operates on a device configured to perform the functions presented herein.

More generally, the POS device 208 may comprise a central processing unit ("CPU"), one or more static or random access memories, and one or more ports to permit connection of one or more external memory or data storage devices. The device may further include a point-of-sale (POS) personal identification number (PIN) entry keypad and one or more displays or display devices. The device may include a payment card reader that may be a smart card reader, a magnetic card reader, a high-capacity optical storage media reader, a bar code, QR code, or other optical data storage reader, a punch card reader, a Braille reader, a contactless card reader, a proximity mobile payments reader that enables communication with smart phone devices, a contactless proximity card reader that processes secure smart ticketing and electronic payments using contactless secure mobile commerce technology, or any other device or system which retrieves information stored on or in a payment card or its functional equivalent. The device may include one or more network connectivity modules for communication using wired, wireless, near-field communications (NFC), other electromagnetic, fiber optic, other optical, or other communication means and/or protocols, including but not limited to Wi-Fi, 802.1 (x)(y) compliant methods, Bluetooth™, infrared, optical, radio frequency, CDMA, GSM, GPRS, and satellite. The network communication modules may include one or more ports enabled and associated with the network communication modules. Network connectivity may be achieved by the device via any one or combination of several communication modules and communication modes based on operational situations. For example, the device may communicate via a wired network using the appropriate wired communication module while the device is placed in a wired connectivity cradle equipped with access to a wired network and the appropriate connector(s) to operatively communicate with a wired communication module port. When the device is removed from the wired connectivity cradle, the device may be switched from a wired communication mode to a wireless communication mode via activation and deactivation of the appropriate communication modules. The switch from wired to wireless communication mode may be performed automatically by software or firmware running on the wireless device or performed manually at the direction of a user. Similarly, the wireless device may automatically select or be manually instructed to utilize one of several available communication modules and modes to use based on operational factors such as, but not limited to, availability of service, signal strength, security considerations, available bandwidth, link reliability, and the like by activating desired communication module(s) and deactivating others. The wired connectivity cradle may also comprise a wireless access port operatively connected to the wired network and accessible by a wireless communication module in one or more wireless devices, thereby providing a localized point of network access for one or more wireless devices in a gaming environment within which the electromagnetic spectrum may be highly congested and radio frequency interference is prevalent. The wireless device may comprise a printer and/or a printer port for connection of an external printer or a plurality of printers connected to a plurality of gaming devices via wired, wireless, or other communication means. The wireless device may be powered by alternating current, direct current, battery, stored charge, solar, or any other known power source available at the point of use. Wireless devices powered by stored energy sources may be periodically recharged from other power sources, including but not limited to charging a stored energy source when the wireless device is placed in a special cradle that may provide wired network connectivity as described above in addition to power charging capability.

Additionally, the embedded controller 202 is communicatively coupled to a wireless communication module 210, which is also configured to support secure wireless communication using wireless communication protocols such as NFC, Bluetooth, Zigbee, DigiMesh, WiFi and other such wireless communication protocols. In the illustrative embodiment, the wireless protocol is NFC and the 802.15.4 wireless protocol. Other illustrative wireless protocols include GSM/GPRS, CDMA, 802.11 and Bluetooth.

The wireless network is a protocol that uses the 802.15.4 standard adds additional routing and networking functionality. Most notably, the system adds mesh networking to the underlying 802.15.4 radio. Mesh networking is used in applications where the range between two points may be beyond the range of the two radios located at those points, but intermediate radios are in place that could forward on any messages to and from the desired radios. The software protocol within the radios will take care of retries, acknowledgements and data message routing. Software also has the ability to self-heal the network. Devices in the network specification can forward all messages not intended for that particular device. The 802.15.4 network was designed for low power and low bandwidth applications. The software protocol may be used for high density locations such as casino gaming floors and public events. In the illustrative embodiment shown in FIG. 2, the illustrative wireless communication module 210 communicates with an aggregator 213.

The illustrative aggregator 213 receives the wireless transmissions and routes them to the backend server over Ethernet. Additionally, the aggregator 213 is configured to transmit the authorization and voucher validation information over the 802.15 wireless network. Furthermore, the data transmitted wirelessly across the network is encrypted with three (3) layers of data security that include tokenization, encryption from the embedded controller 202, and encryption from an alternate mesh protocol such as DIGIMESH™ which is developed by Digi International. DIGIMESH™ provides security using fixed AES-128 encryption that is configurable but does not change during normal operation. The embedded controller 202 further encrypts the data using AES-128, but with keys that are different across all client device and aggregator pairs and that change at least as often as each financial transaction. The third layer of security is provided by using a Derived Unique Key Per Transaction (DUKPT), which is a key management scheme that generates a unique key for every transaction wherein the unique key is derived from a fixed key.

The illustrative aggregator 213 is located at specific locations to minimize the need for individual radios, which creates the ability for the 802.15.4 network to handle many nearly simultaneous transactions. In operation, a preliminary path check ensures the ability of the network to fully route transactional information to the desired source.

The illustrative 802.15.4 network also supports the encryption that is necessary for processing financial transactions, confidential information and for system monitoring. The 802.15.4 wireless protocol operates at a frequency that is not readily discoverable by patrons.

Additionally, the illustrative network is configured to eliminate the need for user credentials so that each client wireless communication module 210 and aggregator 213 may use a unique AES key that changes before each transaction or after a period of expiration. The illustrative 802.15.4 wireless protocol enables client devices, systems and methods presented herein to use proprietary protocols that makes it difficult and/or cost prohibitive for a third party technology to communicate with a CMS system.

In the illustrative embodiment, the embedded controller 202 does not perform payment functions; rather, the payment functions are initiated by the POS terminal 208 or wireless device 124. The embedded controller 202 securely transmits the requests from the POS terminal 208 or wireless device 124. Since the embedded controller 202 does not perform the payment function of generating the EFT request, there is little or no risk of a security breach resulting from the embedded controller 202 initiating a payment transaction. Thus, the embedded controller 202 securely communicates a plurality of transactional data to the backend server 214, in which the transactional data is initiated by the POS terminal 208 or wireless device 124.

The illustrative backend server 214 receives transaction data from the aggregator 213. The transaction data is transmitted to master gateway 218, which in turn sends allowable transactions on to the banking processor (not shown) and waits for an authorization message. The banking processor then proceeds to either approve or deny the transaction. If the transaction is denied, then information regarding the denial is transmitted back through the aggregator 213, 802.15.4 mesh network and embedded controller 202 and eventually displaying a "transaction not approved" message on the POS Device 208 or wireless device 124.

If the transaction is approved, the backend server 214 uses a seed algorithm to generate a voucher validation code; this voucher validation code along with the approval information is logged in to the backend 214 database (described in further detail below) and then transmitted back through the aggregator 213, 802.15.4 network and embedded controller 202 eventually displaying a "transaction approved" message on the POS device 208 or wireless device 124. In conjunction with the approval message, the embedded controller 202 signals the printer sharing board 230 that it wishes to print a voucher. As described above, the printer sharing board 230 allows a break in the communication between the EGM 212 and the TITO printer 204. Once there is a break in the communication between the EGM 212 and the TITO printer 204, the shared printer board 230 allows a queued voucher (not shown) to print on the TITO Printer 204.

After the voucher has printed, a confirmation message is sent back through the 802.15.4 network to the aggregator 213 and then to the backend server 214. This message is entered into the backed server database and is also sent to a CMS 224 and a corresponding CMS database 226 to let the CMS database 226 store the voucher code that represents a redeemable voucher, e.g., TITO ticket.

In the illustrative embodiment, the backend server 214 does not communicate directly with the CMS 224. Instead, the backend server 214 is communicatively coupled to a Slot Machine Interface Board (SMIB) 222 using standard Slot Accounting System (SAS) and/or Game to System (G2S) protocols. The SMIB 222 then communicates with the CMS 224 using the manufacturer's proprietary protocols. The resulting system 200 appears to the CMS 224 as a single slot machine (or multiple slot machines if multiple SMIBs are used) that simply prints/issues TITO tickets. The system 200 enables the patron to receive a newly printed voucher that can be inserted into a bill validator (not shown) corresponding to slot machine 212 and an equivalent number of credits will be placed on the game register of the slot machine 212. Alternatively, the patron can also take the printed voucher to a redemption outlet located on the premises.

A master gateway software module 219 resides in the master gateway 218 and includes proprietary software that communicates with the backend server 214. In the illustrative embodiment, the backend server 214 is communicatively coupled to a banking gateway API using a secure network communication protocol. The master gateway 218 is communicatively coupled to one or more financial networks, including but not limited to the PLUS, STAR, CIRRUS, INTERLINK, MONEY PASS, or NYCE networks, that provide access to the server(s) associated with patrons' financial accounts.

By way of example and not of limitation, the backend server 214 is communicatively coupled to the master gateway 218 using the internet that employs an illustrative security protocol such as HTTPS utilizing SSL/TLS. Other security protocols may also be used. The HTTPS protocol provides authentication and protects the privacy and integrity of the exchanged data.

The master gateway software module 219 includes a payment gateway API that is proprietary to at least one specific payment gateway service. In an alternative embodiment, the master gateway 218 does not include banking gateway software; thus, the master gateway 218 represents an external service associated with, but not controlled by, the transactional system.

In operation, the backend server 214 connects to and exchanges data with the master gateway 218. The transaction is initiated with an outbound EFT request. Applicable data is forwarded from the terminal 208 to the embedded controller 202, which is then sent to the master gateway 218 via backend server 214 and then to the appropriate financial network associated with the institution or other entity that manages and controls the patron's account. The result of the processed EFT request from the institution or entity is conveyed back to the master gateway 218 via the financial network and then back to the embedded controller 202 via backend server 214 for further disposition.

More generally, the master gateway is communicatively coupled to the embedded controller and the backend server 214. The master gateway securely communicates with at least one financial network.

The embedded controller securely communicates the received transactional data to the master gateway using a 802.15.4 network protocol to the aggregator 213, which is communicatively coupled to the backend server 214.

If the transaction is approved, then the master gateway communicates that the transaction is an "authorized transaction" and the backend server 214 generates a TITO ticket serial number. The TITO serial number and authorization information are then passed back through the aggregator 213. The illustrative 802.15.4 network protocol is used from communications between the aggregator 213 and the embedded controller 202.

Additionally, when the POS device 208 receives the approval message, the printer connection 220 is broken between the slot machine (EGM) 212 and the printer 204, which allows a voucher to be printed by the printer 204. The voucher validation number is generated by the backend server 214 and a voucher validation number is communicated to the embedded controller 202, which then proceeds to instruct the printer 204 to print the voucher and or receipt.

The embedded controller 202 then wirelessly communicates that the TITO ticket serial number has been printed to the aggregator 213, which then communicates that the TITO ticket serial number has been printed to the backend server 214.

The backend server 214 then proceeds to communicate through a Slot Machine Interface Board (SMIB) 222 and enters the TITO serial number into a Casino Management System (CMS) 224 that includes a database module 126. The SMIB 222 allows the backend server 214 to communicate with the CMS 224 using standard slot accounting protocols such as G2S and/or SAS.

The CMS 224 then communicates through the SMIB 222 to let the backend server 214 know that the ticket has been successfully logged. The CMS 224 manages the accounting and monitoring system for a casino.

Presently each slot machine, player tracking, or progressive gaming apparatus at a table game is connected to the CMS through wired connections. The client devices, systems and methods presented herein eliminate the need for wiring each individual device, which can be extremely cost prohibitive. More specifically, the illustrative systems and methods substantially reduce the number of wired devices from the thousands to a few dozen aggregators 213.

In yet another embodiment, the master gateway also acts as a gaming regulatory gateway and adheres to limits, rules and standards that are set forth in accordance with specific gaming jurisdictions. The master gateway may or may not handle rules and limits for more than one instance of the product simultaneously, such as handling rules of jurisdiction one for site one and rules of jurisdiction two for site two. The master gateway makes initial determinations based on these limits, rules and standards about whether a transaction should be processed and sent on to the financial network or rejected without being sent.

The master gateway also has the ability to apply business based logic rules to initiated transactions. These parameters will determine the optimal transaction routing through the payment networks and can also determine whether or not to deny transactions based on pre-determined criteria.

Figure 3:
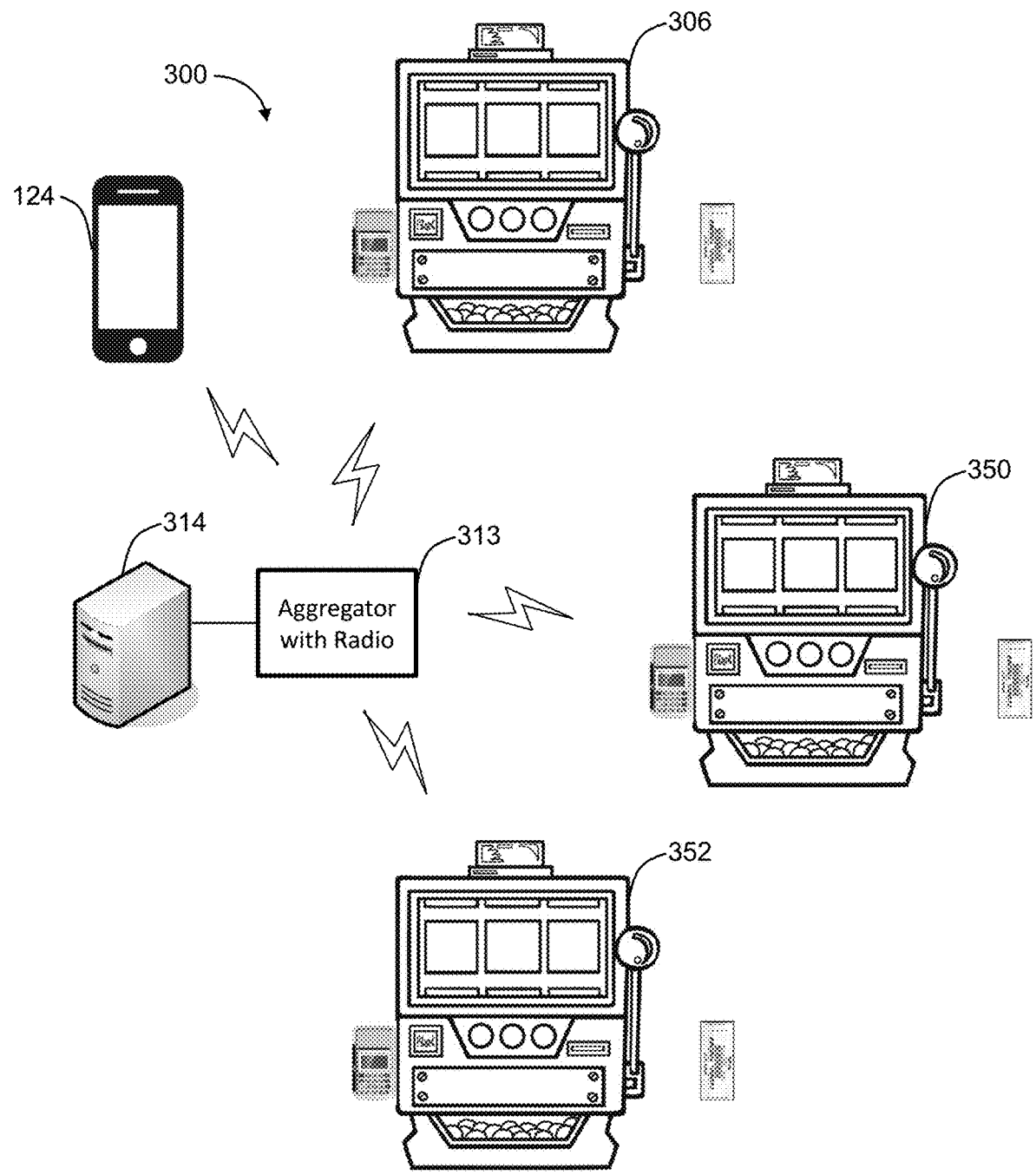
FIG. 3 shows a plurality of client devices communicatively coupled to the backend server.

Referring to FIG. 3, there is shown a plurality of client devices communicatively coupled to the backend server. The client devices 124, 306, 350 and 352 are wirelessly coupled to the aggregator radio 313. Each of the client devices includes a wireless communications module that allow for bi-directional data transmission between each client device located on a casino gaming floor. Additionally, the wireless communications module allows each client device to send and receive data through radio transmissions sent from an out of range client device through a series of data rebroadcasts from at least one wireless communications module that is communicatively coupled to each out of range client device.

Figure 4:
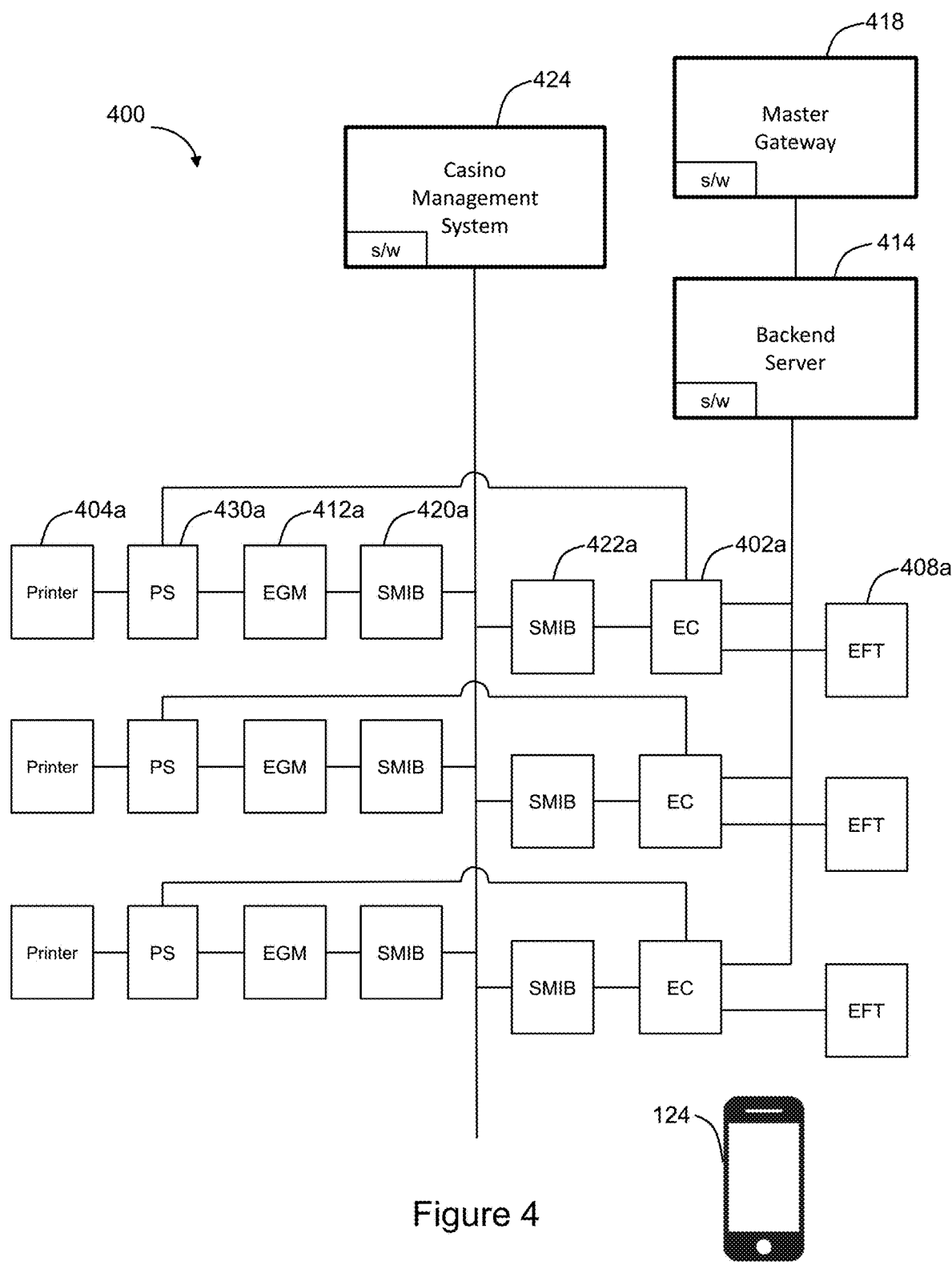
FIG. 4 shows another illustrative embodiment, in which each embedded controller includes a SMIB that is communicatively coupled to the CMS.

Referring to FIG. 4, there is shown another illustrative embodiment that operates similarly to the systems described above. In this illustrative embodiment each embedded controller includes a SMIB that is communicatively coupled to the CMS. The embedded controller 402a is electrically coupled to wireless device 124, POS device 408a, the printer sharing board 430a and SMIB 422a. Additionally, the embedded controller 402a is communicatively coupled to the backend server 414 and the master gateway 418 as described above.

The casino management system 424 is communicatively coupled to the EGM 412a and printer 404a via SMIB 420a. Also, the CMS 424 is communicatively coupled to the embedded controller 402a via SMIB 422a. The controller 402a operates similarly to controller 402a in that the controller is configured to generate a request that is communicated to the printer sharing module that reroutes the communications between the electronic gaming machine and the printer.

The financial gaming passport may also be configured to track player habits and can then be used to incentivize usage of the related mobile application. For example, a casino property may offer discounts or promotions using the financial gaming passport for cashless mobile gaming. Casino patrons may also use the app to obtain a full financial picture of their spending habits for various activities, including gaming at participating casino properties.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A cashless mobile gaming system comprising,
   a network appliance having a financial gaming passport module;
   the financial gaming passport module operating an exchange between a casino patron and a casino operator, in which the exchange qualifies a financial transaction that is performed between the casino patron and the casino operator by ensuring regulatory compliance with one or more gaming regulations;
   a mobile application disposed on a patron wireless device, in which the mobile application receives an exchange request input that is communicated to the financial gaming passport;
   one or more funding sources that are queried by the financial gaming passport to determine the available funds at the funding sources;
   a hold-fund request generated by the funding source when the exchange request is approved by the funding source, wherein the financial gaming passport then receives a communication from the funding source regarding the hold-fund request;
   the financial gaming passport communicates with the casino operator that if the casino operator issues a value to the casino patron, then the financial gaming passport certifies that the casino operator shall be reimbursed within a period of time by the funding source; and
   wherein the financial transaction is performed between the casino patron and the casino operator after the financial gaming passport qualifies the financial transaction as complying with the gaming regulations.

2. The cashless mobile gaming system of claim 1 wherein the funding sources are be associated with at least one of a bank account, a credit account, a cash amount, a TITO ticket, and a credit in a slot machine.

3. The cashless mobile gaming system of claim 2 wherein the hold-fund request locks the available funds and makes them unavailable for spending for a period of time.

4. The cashless mobile gaming system of claim 2 wherein the hold-fund request locks the available funds based on a location of the patron mobile device.

5. The cashless mobile gaming system of claim 2 wherein the hold-fund request releases the hold-fund request based on a location of the patron mobile device.

6. The cashless mobile gaming system of claim 2 further comprising a patron limit instruction that is received by the mobile application disposed on the patron wireless device, wherein the patron limit instruction includes a spending limit that is applied to the one or more funding sources.

7. The cashless mobile gaming system of claim 1 wherein the network appliance includes a master gateway including a problem gaming limit and a gaming rule set; and
   the master gateway determines that the financial transaction complies with at least one of the problem gaming limit and the gaming rule set, wherein the master gateway processes compliant financial transactions and rejects non-compliant financial transactions.

8. The cashless mobile gaming system of claim 7 wherein the master gateway includes at least one of a tribal rule, a state gambling rule, a federal gaming rule, and a casino property rule.

9. A cashless mobile gaming system comprising,
   a master gateway having a financial gaming passport module, wherein the master gateway including a problem gaming limit and a gaming rule set, and the master gateway determines that a financial transaction complies with at least one of the problem gaming limit and the gaming rule set;
   the financial gaming passport module operating an exchange between a casino patron and a casino operator, in which the exchange qualifies a financial transaction that is performed between the casino patron and the casino operator by ensuring regulatory compliance with one or more gaming regulations;
   a mobile application disposed on a patron wireless device, in which the mobile application receives an exchange request input that is communicated to the financial gaming passport;
   one or more funding sources that are queried by the financial gaming passport to determine the available funds at the funding sources, wherein the funding sources are associated with at least one of a bank account, a credit account, a cash account, a TITO ticket, and a credit in a slot machine;
   the financial gaming passport communicates with the casino operator that if the casino operator issues a value to the casino patron, then the financial gaming passport certifies that the casino operator shall be reimbursed within a period of time by the funding source; and
   wherein the financial transaction is performed between the casino patron and the casino operator after the financial gaming passport qualifies the financial transaction as complying with the gaming regulations.

10. The cashless mobile gaming system of claim 9 further comprising a hold-fund request generated by the funding source when the exchange request is approved by the funding source, wherein the financial gaming passport then receives a communication from the funding source regarding the hold-fund request and the hold-fund request locks the available funds and makes them unavailable for spending for a period of time.

11. The cashless mobile gaming system of claim 10 wherein the hold-fund request locks the available funds based on a location of the patron mobile device.

12. The cashless mobile gaming system of claim 10 wherein the hold-fund request releases the hold-fund request based on a location of the patron mobile device.

13. The cashless mobile gaming system of claim 9 further comprising a patron limit instruction that is received by the mobile application disposed on the patron wireless device, wherein the patron limit instruction includes a spending limit that is applied to the one or more funding sources.

14. The cashless mobile gaming system of claim 9 wherein the master gateway includes at least one of a tribal rule, a state gambling rule, a federal gaming rule, and a casino property rule.

15. A cashless mobile gaming method comprising,
operating an exchange between a casino patron and a casino operator with a financial gaming passport module operating, in which the exchange qualifies a financial transaction that is performed between the casino patron and the casino operator by ensuring regulatory compliance with one or more gaming regulations;
determining that a financial transaction complies with at least one of a problem gaming limit and a gaming rule set;
associating the financial gaming passport module with the master gateway;
receiving an exchange request input that is communicated to the financial gaming passport from a mobile application disposed on a patron wireless device;
querying, by the financial gaming passport, one or more funding sources to determine the available funds at the funding sources, wherein the funding sources are associated with at least one of a bank account, a credit account, a cash account, a TITO ticket, and a credit in a slot machine;
generating a hold-fund request, by the funding source, when the exchange request is approved by the funding source;
receiving, by the financial gaming passport, a communication from the funding source regarding the hold-fund request;
communicating, by the financial gaming passport, with the casino operator that if the casino operator issues a value to the casino patron, then the financial gaming passport certifies that the casino operator shall be reimbursed within a period of time by the funding source; and
performing the financial transaction between the casino patron and the casino operator after the financial gaming passport qualifies the financial transaction as complying with the gaming regulations.

16. The cashless mobile gaming method of claim 15 wherein the hold-fund request locks the available funds and makes them unavailable for spending for a period of time.

17. The cashless mobile gaming method of claim 15 wherein the hold-fund request locks the available funds based on a location of the patron mobile device.

18. The cashless mobile gaming method of claim 15 wherein the hold-fund request releases the hold-fund request based on a location of the patron mobile device.

19. The cashless mobile gaming method of claim 15 further comprising receiving a patron limit instruction, by the mobile application disposed on the patron wireless device, in which the patron limit instruction includes a spending limit that is applied to the one or more funding sources.

20. The cashless mobile gaming method of claim 15 wherein the master gateway includes at least one of a tribal rule, a state gambling rule, a federal gaming rule, and a casino property rule.

* * * * *